United States Patent
Lazzerini

[11] Patent Number: 6,126,076
[45] Date of Patent: Oct. 3, 2000

[54] SECURITY STRIP WITH OPTICAL AND MAGNETIC INFORMATION, INSERTABLE IN DOCUMENTS IN GENERAL

[75] Inventor: Maurizio Lazzerini, Cerro al Lambro, Italy

[73] Assignee: Mantegazza Antonio Arti Grafiche S.r.l., Ospiate di Bollate, Italy

[21] Appl. No.: 09/176,760

[22] Filed: Oct. 22, 1998

[30] Foreign Application Priority Data

Nov. 11, 1997 [IT] Italy ................................. MI97A2513

[51] Int. Cl.⁷ .................................................. G06K 19/00
[52] U.S. Cl. .......................... 235/487; 235/488; 235/493; 235/494
[58] Field of Search .................................. 235/487, 380, 235/449, 454, 488, 493, 494

[56] References Cited

U.S. PATENT DOCUMENTS

| | | | |
|---|---|---|---|
| 4,092,526 | 5/1978 | Beck | 235/487 |
| 4,146,664 | 3/1979 | Beck | 428/141 |
| 4,631,222 | 12/1986 | Sander | 428/172 |
| 4,684,795 | 8/1987 | Colgate, Jr. | |
| 4,838,648 | 6/1989 | Phillips et al. | 350/166 |
| 5,371,798 | 12/1994 | McWhortor | 380/51 |
| 5,615,911 | 4/1997 | Jagielinski | 235/493 |
| 5,842,722 | 12/1998 | Carlson | 283/107 |

FOREIGN PATENT DOCUMENTS

| | | |
|---|---|---|
| 0310707 | 4/1989 | European Pat. Off. . |
| 0610917 | 8/1994 | European Pat. Off. . |
| 0683471 | 11/1995 | European Pat. Off. . |
| 0753623 | 1/1997 | European Pat. Off. . |
| 4041025 | 6/1992 | Germany . |
| 19548528 | 6/1997 | Germany . |
| 9312506 | 6/1993 | WIPO . |

*Primary Examiner*—Michael G Lee
*Assistant Examiner*—Douglas X. Rodriguez
*Attorney, Agent, or Firm*—Guido Modiano; Albert Josif; Daniel O'Byrne

[57] ABSTRACT

A security strip with optical and magnetic information and with conductive properties which can be inserted in documents in general, comprising, on a single backing film, magnetic bars with coded information, elements which can be detected optically at least against the light, and an electrically conductive layer which can be detected by capacitive circuits. The magnetic bars and the optically detectable elements are arranged mutually in register with no tolerance.

14 Claims, 1 Drawing Sheet

SECURITY STRIP WITH OPTICAL AND MAGNETIC INFORMATION, INSERTABLE IN DOCUMENTS IN GENERAL

BACKGROUND OF THE INVENTION

The present invention relates to a security strip with optical and magnetic information and with conductive properties, insertable in documents in general.

It is known that documents which represent a value, such as bank notes, paper currency and the like, currently use security strips inserted in the paper or sheet-like element that forms the document.

It is already known to insert two kinds of strip in high-value documents, particularly a negative-microprinted strip and a strip with a magnetic code, and to insert a single strip having conductive properties in lower-value documents.

The microprinted strip allows the public or in any case the user to read the texts against the light, thus allowing a first possibility to quickly check the authenticity of the document, while the second magnetically coded strip allows to perform validation or reading by means of devices which are capable of detecting the code and of interpreting it, in the case of the magnetic strip, and of detecting its presence, in the case of the conductive strip.

Accordingly, currently it is necessary to use at least two security strips formed by separate elements which are individually inserted in the document and are not mutually connected.

The above-described solution therefore entails the drawback that it requires relatively complicated operations since it is necessary to insert two separate strips in the document.

SUMMARY OF THE INVENTION

The aim of the present invention is to solve the above problems, by providing a security strip with optical and magnetic information which can be inserted in documents in general and allows to combine the typical advantages of the two separate strips used in the prior art and in particular allows to optically detect lettering and the like, to have magnetic codes which can be detected by a suitable device, and to detect the presence of conductivity.

Within the scope of this aim, a particular object of the present invention is to provide a security strip in which it is practically impossible to reproduce said strip because it is impossible, in practice, to reproduce all the security elements provided therein.

Another object of the present invention is to provide a security strip with optical and magnetic information which, by virtue of its particular constructive characteristics, is capable of giving the greatest assurances of reliability and safety in use.

Another object of the present invention is to provide a security strip which can be obtained easily starting from commonly commercially available elements and materials and is also competitive from a purely economical point of view.

This aim, these objects and others which will become apparent hereinafter are achieved by a security strip with optical and magnetic information which can be inserted in documents in general, characterized in that it comprises, on a single backing film, magnetic means with coded information and means which can be detected optically at least against the light, said magnetic means and said optically detectable means being arranged in register with each other.

BRIEF DESCRIPTION OF THE DRAWINGS

Further characteristics and advantages of the invention will become apparent from the following detailed description of a preferred but not exclusive embodiment of a security strip with optical and magnetic information insertable in documents in general, illustrated only by way of non-limitative example in the accompanying drawings, wherein.

DESCRIPTION OF THE PREFERRED EMBODIMENTS

Figure 1:
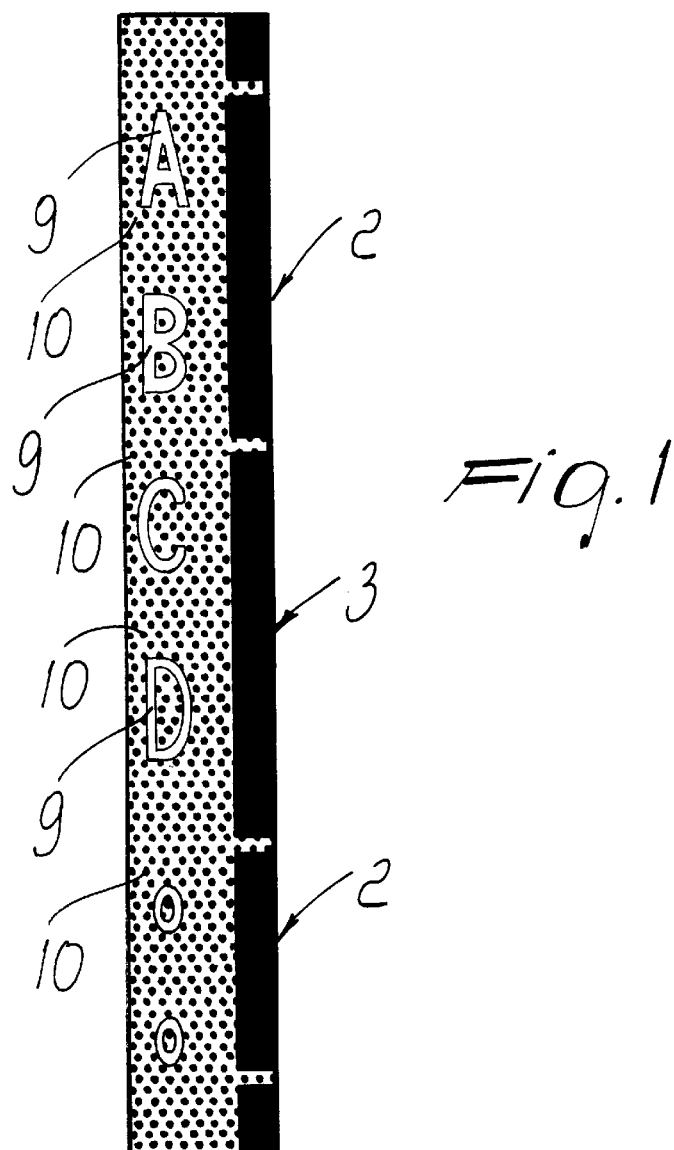
FIG. 1 is a schematic plan view of the strip according to the invention.
Figure 2:
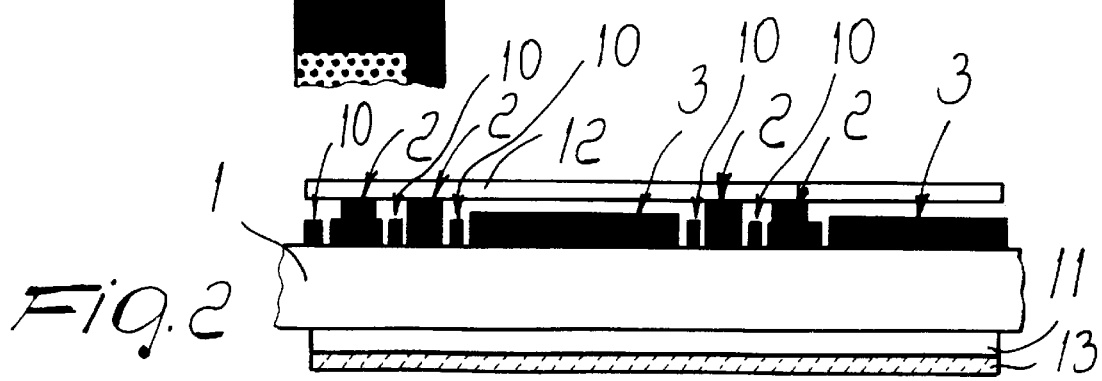
FIG. 2 is a schematic sectional view of the strip.

With reference to the above figures, the security strip with optical and magnetic information insertable in documents in general, according to the invention, comprises a backing film 1 which is preferably constituted by a continuous polyester tape which is 1 to 2 mm wide.

Magnetic means with coded information, for example of the type disclosed in EP-310707 in the name of this same Applicant, are simultaneously provided on the backing film 1. In practice, the magnetic means are constituted by bars 2 whose magnetic level differs from that of a base layer 10 which covers the film 1, in practice forming a code which can be read by means of a suitable device; this differentiation can be achieved by using different thicknesses of magnetic ink.

Masking bars 3 can be provided between the bars that form the code; such masking bars 3 are merely meant to appear optically similar to the bars 2 provided with magnetic code but have a different magnetic response, so as to prevent easy optical detection of the magnetic code. The bars 3 have, for example, a thickness which lies between the thickness of the base 10 and the thickness of the bars 2.

Optically detectable means are provided together with the magnetic coding and are constituted by graphic elements 9, letters of the alphabet or the like which are negative-printed on the base 10 that covers the film 1, so that said means can be detected optically at least against the light. A lower white layer 11 and an upper white layer 12 with thermal-bonding properties are further provided so that the magnetic code is anchored to the paper. An electrically conductive layer 13 is also provided which is advantageously optically transparent, as disclosed for example in Italian Patent Application No. MI 97 A 01666.

The optically detectable means and the magnetic means are perfectly in register with each other and, according to the described embodiment, the magnetic means run longitudinally along one edge of the film 1 and the optically detectable means are arranged in register at the opposite edge. It is of course also possible to interleave at will the magnetic means and the optically detectable means, without renouncing the possibility to arrange in perfect mutual register the magnetic means and the optically detectable means arranged on a single backing.

In order to further increase the security criteria it is possible to provide a base formed by means of mutually separate and isolated dots, without altering the characteristic that the optically detectable means are visible against the light.

An important characteristic is constituted by the fact that the base, the magnetic means and the elements for optically masking the magnetic code are provided by means of the same ink, which is a magnetic ink, and that the differences in the magnetic level are obtained by varying the thickness of the bars, as specified in the above-cited patent EP 310707.

From the above description it is thus evident that the invention achieves the intended aim and objects, and in particular the fact is stressed that a single security strip is provided which combines security characteristics hitherto obtained by using three separate strips inserted separately in documents, with the obvious related problems; moreover, the use of a single strip allows to keep in register both the optically detectable means and the magnetically detectable means.

The invention thus conceived is susceptible of numerous modifications and variations, all of which are within the scope of the inventive concept.

All the details may also be replaced with other technically equivalent elements.

In practice, the materials employed, as well as the contingent shapes and dimensions, may be any according to requirements.

The disclosures in Italian Patent Application No. MI97A002513 from which this application claims priority are incorporated herein by reference.

What is claimed is:

1. A security strip with optical and magnetic information which can be inserted in documents in general, comprising, on a single backing film, magnetic means with coded information and means which can be detected optically at least against the light, said magnetic means and said means which can be detected optically being arranged in register with each other, and magnetic means with coded information comprising bars having a different magnetic level with respect to a base printing which affects said backing film, and the security strip further comprising, between said magnetic bars with coded information, masking bars having a magnetic level different from that of said magnetic bars with coded information, an optical appearance which is substantially identical, to that of said bars with coded information.

2. The security strip according to claim 1, comprising electrically conductive means.

3. The security strip according to claim 2, wherein said electrically conductive means comprise an electrically conductive layer.

4. The security strip according to claim 3, wherein said electrically conductive layer is optically transparent.

5. The security strip according to claim 1, wherein said magnetic means and said means which can be detected optically are printed with the same ink.

6. The security strip according to claim 1, wherein said magnetic means and said means which can be detected optically are printed with a single printing plate and therefore in a single pass.

7. The security strip according to claim 1, wherein said means which can be detected optically are negative-printed on the base provided on said backing film.

8. The security strip according to claim 1, wherein said base is constituted by a continuous layer.

9. The security strip according to claim 1, wherein said base is formed by isolated and mutually separate dots.

10. The security strip according to claim 1, wherein said backing film has a lower white layer and an upper white layer for covering both faces of said film.

11. The security strip according to claim 1, wherein said backing film is constituted by a polyester tape which is 1 to 2 mm wide.

12. The security strip according to claim 11, wherein said magnetic means lie longitudinally at one edge of said tape and said means which can be detected optically lie longitudinally at an opposite edge.

13. The security strip according to claim 1, wherein said magnetic means and said means which can be detected optically are interleaved and in register.

14. A document comprising a sheet-like element in which a security strip according to claim 1 is embedded.

* * * * *